United States Patent [19]

Lucas et al.

[11] Patent Number: 4,503,767

[45] Date of Patent: Mar. 12, 1985

[54] METHOD AND APPARATUS FOR SUSTAINING AN OSCILLATORY MOVEMENT

[75] Inventors: Jean Lucas; Jean-Francois Goupillon; Bernard Drouin, all of Antony, France

[73] Assignee: Centre National du Machinisme Agricole, du Genie Rural, des Eaux et des Forets, Antony, France

[21] Appl. No.: 267,297

[22] Filed: May 26, 1981

[30] Foreign Application Priority Data

May 28, 1980 [FR] France ........................... 80 11782

[51] Int. Cl.³ .............................................. B30B 1/00
[52] U.S. Cl. ..................................... 100/214; 92/131; 56/341
[58] Field of Search ................ 60/369, 371, 377, 378, 60/380, 473, 476, 327; 92/131, 152, 85; 91/346; 100/269 R; 56/341

[56] References Cited

U.S. PATENT DOCUMENTS

| | | | |
|---|---|---|---|
| 1,290,203 | 1/1919 | Houk | 60/371 |
| 2,980,079 | 4/1961 | Joelson | 60/371 |
| 3,137,139 | 6/1964 | Stordahl | 60/369 |
| 3,312,146 | 4/1967 | Quere et al. | 92/152 |

FOREIGN PATENT DOCUMENTS

| | | |
|---|---|---|
| 642866 | 1/1964 | Belgium . |
| 1550930 | 12/1958 | France . |
| 2224656 | 10/1974 | France ........................... 92/131 |
| 511747 | 8/1939 | United Kingdom ................. 60/327 |
| 1142651 | 12/1969 | United Kingdom . |

Primary Examiner—Robert P. Swiatek
Assistant Examiner—John G. Weiss
Attorney, Agent, or Firm—Young & Thompson

[57] ABSTRACT

Method and apparatus for sustaining the oscillatory movement of an oscillating device of the type comprising a mass oscillating between dead points on opposite sides of a point of equilibrium, with a potential force acting to return the mass toward the point of equilibrium. This potential force is greatest at the dead points and the speed of the oscillating point is greatest adjacent the point of equilibrium. A force is applied to the device from a motive source, which force is greater than the maximum potential force at a speed lower than the speed of the device adjacent the point of equilibrium. The force of the motive source is applied to the oscillating device on the portion of the path of movement of the oscillating device preceding one of the dead points, and the application speed of the force of the motive source is higher than what would be the instantaneous speed of the oscillating device along that portion of its trajectory were the force of the motive source not applied. In other words, when the mass slows down approaching a dead point, we give it a push. The device is particularly useful in a hay baler of the type producing small, very dense blocks of hay.

16 Claims, 12 Drawing Figures

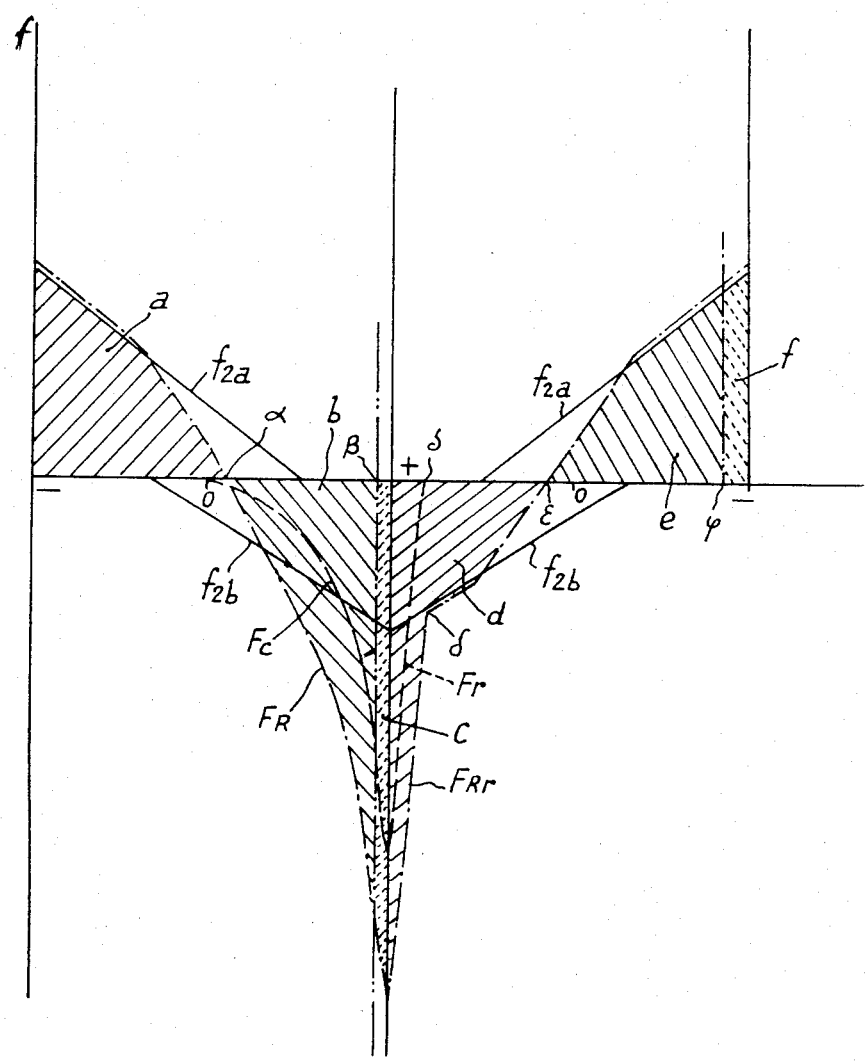

METHOD AND APPARATUS FOR SUSTAINING AN OSCILLATORY MOVEMENT

FIELD OF THE INVENTION

The present invention relates to oscillating devices, either of the pendulum type or of the return type by a resilient element of the spring or compressible gaseous mass type, and whether the oscillatory movement is of the sinusoidal type or of the free stroke type with absorption and restitution in the reverse direction of the kinetic energy provided on a fraction of the trajectory which is close to the dead point.

BACKGROUND OF THE INVENTION

Mechanically, an oscillatory movement is damped by the friction forces on the bearings, the guiding surfaces and/or the medium in which moves the oscillating member. Said movement therefore has to be sustained by supplying it with energy compensating for that absorbed by the friction forces. Usually, said energy is provided in the well known clockworks by a so-called escapement or by an electromagnetic coil fed at the oscillation frequency. The characteristic of such known mechanisms for sustaining a pendular motion is that the transmission of the work providing the compensation for the friction occurs substantially in the portion of the trajectory which is in the vicinity of the point of equilibrium of the device and is cancelled in the vicinity of the dead points so as to let the device oscillate at its own frequency. It will be recalled that in an oscillating device such as hereabove, the return forces towards the point of equilibrium are maximum at the dead points corresponding to a maximum deviation, and that the speeds are highest when the oscillating device passes by the point of equilibrium while the return force is cancelled at this point. In order to transmit energy sustaining the oscillatory movement of an oscillating device in the area of the point of equilibrium, the application speed of the so-called sustaining force must therefore be high and at least equal to the instantaneous speed of the receiving member which is rigidly connected to the oscillating mass. In an escapement mechanism, the peripheral speed of the wheel at the point of contact with the pendulum finger of the escapement tends to be higher than the instantaneous oscillation speed of said finger.

In the devices of the free stroke type, there is exerted on the mass, while it moves at a low speed over the first part of its trajectory from a dead point, a force which is added to that exerted by the storing and restitution device of the kinetic energy.

Moreover, one should remark that if a work other than that resulting from the friction forces is required from the oscillating device, the oscillatory movement goes on only if it is sustained by introducing in the device energy equivalent to that which has been performed.

On the other hand, it is known how to use the kinetic energy of a pendulum mass for performing work, for example in pendular rams, but this mode of utilization does not correspond to a sustained oscillatory movement.

OBJECT AND SUMMARY OF THE INVENTION

The main object of the present invention is to perform, by using the kinetic energy of an oscillating device, work wherein the resisting force is applied to the oscillating mass as a braking force over a portion of the trajectory of said oscillating mass which is close to a dead point, and notably wherein the resisting force increases as the oscillating mass comes nearer to said dead point. This is for example the case where the oscillating mass is connected to the compression piston of a compressible mass. Where the resilient return stroke is limited, viz. where the compressible mass absorbs a work of which it restores resiliently only a fraction, the return oscillation is damped and the opposite dead point will have a tendency to draw nearer to the point of equilibrium. Therefore it is necessary to restore to the oscillating device, at each oscillation, the work absorbed by the compression so as to maintain constant the amplitude of the oscilatory movement. Moreover, the kinetic energy stored in the oscillating mass can often, in practice, correspond to only a fraction of the work to be supplied for the compression and therefore the oscillating system would not reach the dead point corresponding to the end of the compression stroke. Thus, it is necessary to provide to the oscillating system, during the useful stroke, viz. during the compression stroke, the fraction of said compression work which corresponds to the difference between the total compression work and the kinetic energy.

A problem which the invention also aims at solving is that of the compression under a high pressure and at a high speed of a partly resilient mass so as to partly recover the resilient return force. Indeed, the motive sources which are available exhibit a relatively constant relation between the useful force and its speed of application, viz. a high force corresponds to a slow application speed, and for a given type of motive source, the application speed is limited. By way of example, a hydraulic motor or a hydraulic jack can produce a high torque or force, but since the speed is proportional to the flow rate, the application speed is inevitably limited. If the supply pump has a constant capacity, at the beginning of the alternating motion, the useful speed and therefore the flow increase from zero and the pump excess flow is recirculated and represents lost work; in an alternating motion device driven by such a motive source such as an oscillating device to which the work supplied is used by a hydraulic jack, the speed is limited by the section of the jack which is determined by the maximum force to be exerted by the jack at the end of the useful stroke.

The object of the present invention is to remedy such disadvantages and to provide a method for sustaining the oscillatory movement of an oscillating device with a motive source supplying a force superior to the potential force of the oscillating device at the level of its dead points, the application speed of said force being lower than the speed of the oscillating system in the region surrounding its point of equilibrium, said method being characterized in that the force of the motive source is applied to the oscillating device on the portion of the trajectory of said oscillating device preceding a dead point along which portion the application speed of the force of the motive source is higher than the instantaneous speed of the oscillating device.

It is to be noted that with an oscillating device having the oscillations sustained by the method according to this first characteristic of the invention and contrary to the standard sustained oscillating devices, the period is not constant since the end of the trajectory, viz. an end fraction of said trajectory which is a function of the absorbed work, is covered at a speed which is a function of the motive source, but the potential energy at the dead points is constant and independent of the absorbed work and, moreover, the frequency is higher than that of an oscillating device sustained in a standard manner by compensation of the work absorbed in the portion of the trajectory adjacent the point of equilibrium.

According to a first embodiment, the motive source is put out of action when the oscillating device reaches the considered dead point, meaning that the dead point where the reversal of the oscillating motion occurs is fixed.

According to a second embodiment more particularly applicable to the case where the oscillating device supplies during the considered oscillation work of variable intensity such as the compression under a determined unit compression force of a variable volume of a compressible mass, the motive source is put out of action when the motive force which it exerts on the oscillating device reaches a predetermined value.

According to a further characteristic, the oscillating device is frequency piloted, the reversal of the direction of the force exerted by the motive source at the level of a dead point, said reversal comprising the cancellation of said force, occurring at a frequency lower than the natural oscillation frequency of the device.

A further object of the invention is the application of the hereabove mentioned method to an oscillating device having a sustaining force provided by a hydraulic fluid under pressure, application wherein: the oscillating mass, which can be a pendular mass or a mass interposed between two resilient elements acting in opposition, is rigidly associated with hydraulic power receivers such as hydraulic jacks or an equivalent means such as a double-acting jack, adapted for exerting on said mass a thrust bringing it back to each of its dead points, higher than the resisting force opposed to it, said jacks being set selectively in controlled communication with a source of non compressible fluid under pressure and capable of drawing fluid at a flow rate ensuring their repletion at the maximum speed of their instantaneous volume displacement from a source of the same fluid, and where that one of said receivers which exerts a thrust towards the terminal dead point of the oscillation in progress is selectively fed. As long as the volume displaced by the hydraulic receiver, for example the jack piston, is higher than the flow rate of the source of fluid under pressure, said receiver is driven by the energy stored by the oscillating device and the jack draws fluid from the repletion source, but when the flow provided by the motive source becomes equal to the flow absorbed by the hydraulic receiver, the source of oil under pressure increases the pressure in the receiver for bringing the oscillating device to the dead point.

According to the invention, the feeding of the receiving device can be interrupted and the device connected to the exhaust either when the oscillating device has reached a determined point of its trajectory which corresponds to the fixed dead point, or when the feeding pressure of the hydraulic receiver reaches a pre-determined value, thereby giving to said end of the trajectory a dead point of variable position.

An object of the invention is also to provide an oscillating device, ensuring notably the driving of a compression piston, the oscillation frequency of which is very high. The speed of the oscillating device such as above in the portion of the trajectory where the oscillating device is not driven by the device which sustains the oscillation depends on the value of the return force. Consequently and according to a further characteristic of the invention, a portion at least of the return force of the oscillating device is provided by a resilient means stretched, at least in part, by the device sustaining the oscillation. This is particularly the case at the level of the dead point corresponding to the compression stroke. According to a further characteristic, the energy storing capacity of the resilient means is higher than the kinetic energy of the oscillating device. With this characteristic and with the method for sustaining the oscillating motion according to the invention, there is stored at the level of the dead point, in the oscillating device, extra energy adapted to be recovered during the following oscillation.

In the practical application to an oscillating device having a sustaining force provided by a hydraulic fluid under pressure, at least part of the kinetic energy of the oscillating device is absorbed, at least at the end of the oscillation of said device, and recovered in the initial portion of the following oscillation by a spring which is preferably formed by hydropneumatic receiver. Said device stores at the end of the oscillation a potential energy which is supplied by the receiver and increases the oscillation speed of the device. In the case of an oscillation stroke providing work, for example a compression stroke, the work corresponding to the stored potential energy has to be supplied by the hydraulic receiver to the oscillating device, in addition to the work necessary for sustaining the movement, the useful compression force being equal to the force exerted by the hydraulic receiver less the reaction force of the hydropneumatic receiver. However, this does not represent a disadvantage but offers on the contrary advantages since the thrust force of the hydraulic receiver is far higher than the value of the reaction force of the hydropneumatic receiver necessary for obtaining a high oscillation speed and the stored work is recovered in the form of kinetic energy, in the portion of the operation period where the compression is ensured by the kinetic energy alone of the oscillating device, the speed of which is higher than the application speed of the force of the hydraulic receiver.

The method for sustaining an oscillatory movement and its application to oscillating devices having a sustaining force provided by a high pressure hydraulic fluid according to the invention is of particular interest in the case of mobile hay balers used for collecting hay gathered in windrows on the ground after harvesting and for compressing it into hay bales.

The presses generally used presently compress the straw into the shape of parallelepipedal bales having a weight of 30 odd kilograms, the voluminal density being, for bales obtained by high density presses, 100 to 150 kg/m$^3$. Said bales do not have any notable mechanical strength and they have to be tied up.

The present situation has led to consider recovering hay which is often burnt in the fields, either for stockfeed, or as raw material for the manufacture of paper or of thermal insulation panels, or also as combustible or an energy raw material. These various uses call for the transportation of the hay bales over distances which can be important, so that the handling and transportation costs have an impact on the cost of the raw material. Due to the relatively low density of the present hay bales, the loading of the trucks and other means of transportation is limited by the volume and not by the useful load, thereby increasing the cost of the transport. The relative mechanical fragility of the bales makes their handling difficult, thereby increasing the cost of the loading and unloading operations and necessitating in any case the binding of the bales with a resistant bond the price of which has also an influence on the cost price.

A further problem occuring as regards the press as such is the necessity of having a moving press adapted for moving in the field and comprising picking-up and feeding means since, due to the geographical dispersion, the low density and the low economic value of the material to be processed, it cannot be considered to pick up and transport the hay to a fixed installation.

Economic considerations require a press capable of baling about 10 ton of hay per hour.

In order to solve these problems, efforts have been made to make a press producing blocks of hay at a very high density of the order of 500 kg/m$^3$ and a reduced volume lower than 0.01 m$^3$, the weight of the block varying as a function of the density of the windrow, but the voluminal mass being maintained as constant as possible. Such hay blocks have the advantage of exhibiting a good mechanical strength, which avoids the necessity of a bond and allows handling them and transporting them in bulk.

However and in view of the efficiency which is considered as economically indispensable, this solution calls for a production of about a block per second. This, added to the fact that the hay compressed into blocks expands after the compression and that for obtaining a voluminal density of 500 kg/m$^3$, and due to compression curve which is hyperbolic, the product has to be compressed up to about 1000 kg/m$^3$ under a pressure which can reach 300 to 400 bars, means that the press must simultaneously operate at a very high frequency, with a high speed at least during the first phase of the compression and use a driving device providing an extremely high thrust force.

The known presses operating by compression in a channel acting as a draw-member have a yield which is too small and require on the one hand a pre-chopping of the straw and on the other hand to much power due to the inner friction. The compression piston type presses where the compression piston is operated by a jack are also known and it has already been proposed to combine pistons acting in succession in two directions on the same mass so as to compress it and make blocks. Said presses however cannot be used in the case of the present invention due to the incompatibility hereabove explained between a high operating speed and a high compression force.

The method according to the present invention allows to obtain these results due to the fact that the press according to the invention is characterized in that the initial phase of the compression work is provided by the potential kinetic energy stored during the return stroke of the press piston in a resilient accumulator, the final phase of the compression work being ensured by a driving device applying a high thrust force at a reduced application speed.

According to a further feature allowing increasing the speed of the return stroke, a resilient accumulator is stretched at the end of the compression stroke by the driving device which provides a high thrust force at a reduced application speed, the energy stored in said resilient accumulator being imported to the oscillating device at the beginning of the return stroke. This imparted energy leaving a residual energy at the end of the return stroke, said residual energy is stored, with the optional addition of extra energy provided by the driving device, in a resilient accumulator stretched at the end of the return stroke, the energy stored in said resilient accumulator being imparted to the oscillating device at the beginning of the compression stroke.

The press being a self-propelling press which moves over the field, it is essential to ensure its dynamic balancing. Said dynamic balanced is provided by the fact the mass of the piston and associated elements is equilibrated by an equilibration mass the displacement of which is connected to that of the piston mass via a non resilient transmission so that the barycentres of the piston and associated elements on the one hand, and the equilibration mass on the other hand, provide a barycenter of the assembly which is almost fixed. With this embodiment and within the scope of the method according to the invention, the equilibration mass is included in the kinematic system of oscillating device and its kinetic energy i added to that of the piston and associated elements.

It is obvious that known devices of motion transformation can also be interposed between the compression piston, the driving device and/or the resilient accumulator for modifying the geometrical, kinematic and/or dynamic characteristics of the various members. This is notably the case of the device with two knuckle articulated connecting rods, the opening and closing of the knuckle being controlled by a hydraulic jack.

Due to the low density of the straw when gathered by the usual gathering devices, the compression of the hay press according to the invention has to be carried out in at least two steps and the press as such is, in known manner, of the type with two compression devices, the compression strokes being in two substantially perpendicular directions.

Consequently and according to an embodiment, the hay press according to the invention comprises as main elements a self-propelling or towable support frame, a pick-up device for the hay and for feeding the straw to the press as such, a press as such of the type with two compression devices, the compression strokes of which are in two substantially perpendicular directions, the straw subjected to a first compression step in the first device being compressed in the second device in which it is subjected to a second compression step and an ejecting step, the press as such being characterized in that each device providing a compression step is comprised by a compression piston with pendular motion, controlled by a device with two knuckle-articulated connecting rods, the opening and closing of said knuckle being controlled by a hydraulic jack according to the so-called four bar arrangement, the control by the jack being of the type of energy accumulation and restitution, the central articulation of the knuckle moving past, during the back return stroke of the piston, the line of axes passing through the two fixed articulation points of the knuckle and of the jack, by storing the energy in an accumulator which restores it to the system during the initial portion of the forward stroke of the jack piston.

According to another feature, the accumulator is of the hydropneumatic type and is in communication with the chamber opposite the active chamber of the jack.

In this embodiment, the control device of the compression piston comprises three fixed points on the frame, viz. the articulation of the pendular arm carrying the piston, the articulation of the knuckle connecting rod assembly the opposite articulation of which is rigidly connected to the pendular arm carrying the piston and the articulation of the jack the other end of which is articulated on the central articulation of the knuckle.

According to a feature of the invention, the relative positions of the jack articulation and of the articulation, on the frame, of the knuckle connecting rod assembly, and the lengths of the pendular arm and of the connecting rods of the knuckle assembly are such that at the end of the compression stroke, the line of action of the jack is substantially coincident with the bisectrix of the knuckle angle. This arrangement allows reducing the cross-section of the jack and therefore the volume generated and the flow rate of the high pressure pump.

According to a further feature of the invention, the bar system formed by the connecting rod assembly and the jack is isostatic, that is self-positioning, the two articulations at the end of the jack and the articulation of the connecting rod on the piston being swivel articulations. The advantage resulting therefrom is that the bars and the jack are subjected only to traction or compression stresses without torsion or bending.

This solution where the articulation of the knuckle and the articulation of the jack on the knuckle are coincident allows, as in the case where the two articulations are in alignment along to an axis perpendicular to the lines of action of the three elements, to cross the bars, that is to obtain the necessary clearance for the operation with energy accumulation and restitution at the end of the return stroke and at the beginning of the compression stroke.

Since the rear dead point of the compression pistons is reached, by virtue of the method which is used, during an expansion stroke of the control jack, when the piston has a cross-section as great as the jack of the second stage, the jack can cavitate in the rear portion of its stroke and the rear dead point of the piston could possibly not be reached. For remedying this situation, there is provided a secondary jack which acts on the connecting rod assembly in the reverse direction to the movement providing the compression for bringing the system back to the position of maximum energy accumulation.

According to a further feature, the dynamic equilibration of the press is provided for each compression stage by a mass suspended from the frame in a pendular way about an axis parallel to the axes of the four bar system of the compression stage and driven by a connecting rod assembly, from the control connecting rod assembly of the compression piston, in order to have at any moment a direction of displacement which is opposite to the displacement direction of the barycenter of the masses of the compression device of the stage. The displacement radius of the mass is determined by calculation for improving the inertia torque. According to a preferred embodiment, the equilibration mass is suspended by a pendular arm having an axis co-planar with the articulation axis of the compression piston and the jack swivel, said arm being driven by a connecting rod articulated at the end of a crank formed by a prolongation of the compression system crank.

According to another feature, the ejection device of the compressed block out of the compression chamber of the second compression stage is a plate which closes, when at rest, the lower wall of said chamber, said plate being carried by an arm mounted oscillatingly about an axis parallel to the articulation axes of the second compression stage, said oscillating arm being driven in the ejection direction, from the oscillation axis of the piston of the first compression stage, by a radial arm rigidly connected to said axis, the end of which is connected to the oscillating arm of the ejector by a telescopic connecting rod the elongation of which is controlled by a detent system permitting said elongation after a first fraction of the compression stroke of the first stage, the ejector being resiliently returned to its rest position with a concomitant elongation of the telescopic connecting rod. According to a preferred embodiment, the detent is made of a roller fixed at the end of the connecting rod and engaging a stop cam rigidly connected to the shaft of the connecting rod, the cam being disengaged by reduction of the angle between the radial arm and the telescopic connecting rod, the reengagement occuring at the end of the return stroke of the first stage compression piston.

According to another feature, the hay loading device in the first stage compression chamber comprises a movable wall, displaceable on the conveyor plate of the hay fed on said plate by any known device, perpendicularly to the trajectory of the first stage compression piston, the displacement of said movable wall being guided by a switching off cam and provided by a rod substantially parallel to its displacement direction which is rigidly connected to it and by a crank articulated about an axis perpendicular to said displacement direction, the driving being provided by an oblique connecting rod acting between intermediate points of said crank and of the first stage compression piston arm in cooperation with a resilient return device of the movable wall on the upper return guiding portion of the cam. With this embodiment, the hay is loaded into the compression chamber during the return movement of the first stage compression piston. Preferably, the movable wall is made of teeth connected by an upper crosspiece.

BRIEF DESCRIPTION OF THE DRAWINGS

Further features of the present invention will become more apparent from the description of the method which is the object of the present invention, from the detailed description of an embodiment of the very high density hay press and from the description of an alternative embodiment shown schematically, with reference to the accompanying drawings wherein:

FIG. 2 is a graph of the forces acting in said oscillating device.

DETAILED DESCRIPTION OF THE EMBODIMENTS

Figure 1:
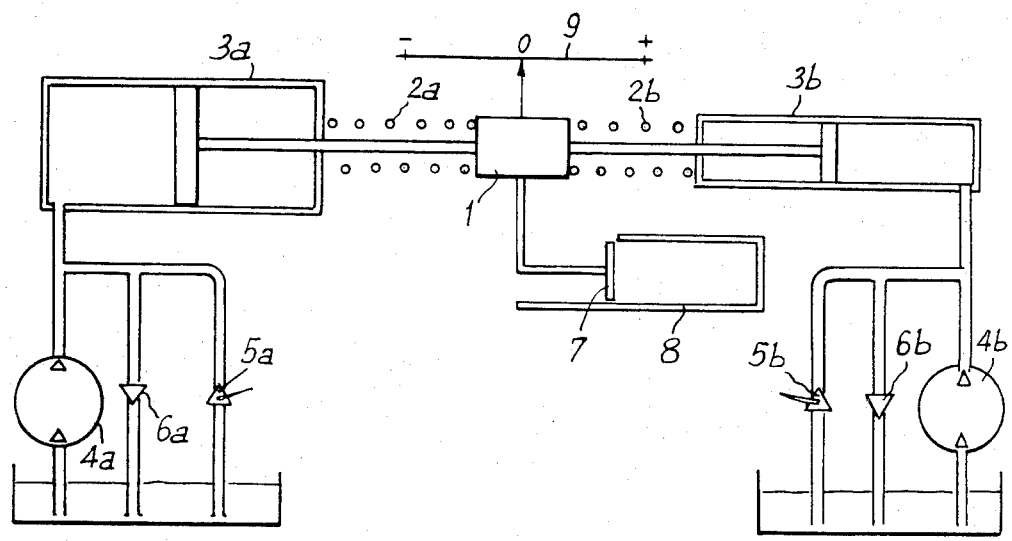
FIG. 1 is a diagrammatic representation of an oscillating device sustained by the method according to the invention.

The oscillating device of FIG. 1 comprises schematically an oscillating mass 1 suspended between two springs 2a, 2b and rigidly connected to the pistons of two jacks 3a and 3b acting in opposition on the mass. Each jack is supplied by a pump 4a, 4b, and can be set in communication with the exhaust by a controlled valve 5a, 5b. The pumps are short-circuited by a by-pass controlled by a non-return valve 6a–6b. The mass 1 is rigidly connected to the compression piston 7 of a press indicated broadly by the compression chamber 8 which is for example a hay press. The study of the operation of the oscillating system will be made by using graphs the abscissae of which correspond to the positions of the mass 1 detected on scale 9, the positive values of the forces and of the speeds corresponding to the arrow of said scale.

On the graph of FIG. 2 is shown at $f_{2a}$ the force exerted by spring 2a, at $f_{2b}$ the force exerted by spring 2b, at Fc in broken line the compression force and at $F_r$ in broken line the detent force of the compressed hay mass, $F_R$ in chain-dot line representing the resultant of the forces of the oscillating system applied to mass 1. The direction of the displacement of mass 1 is positive from (—) to (+), then negative from (+) to (—) and becomes again positive from (—) to (+). For making the graph clearer, the ordinates of the curve Fc $F_r$ have been reduced but the exact ratio between the supplied work and the stored kinetic energy, viz. the potential work stored in the oscillating device, is not to be taken in account for the explanation of the operation.

Figure 3:
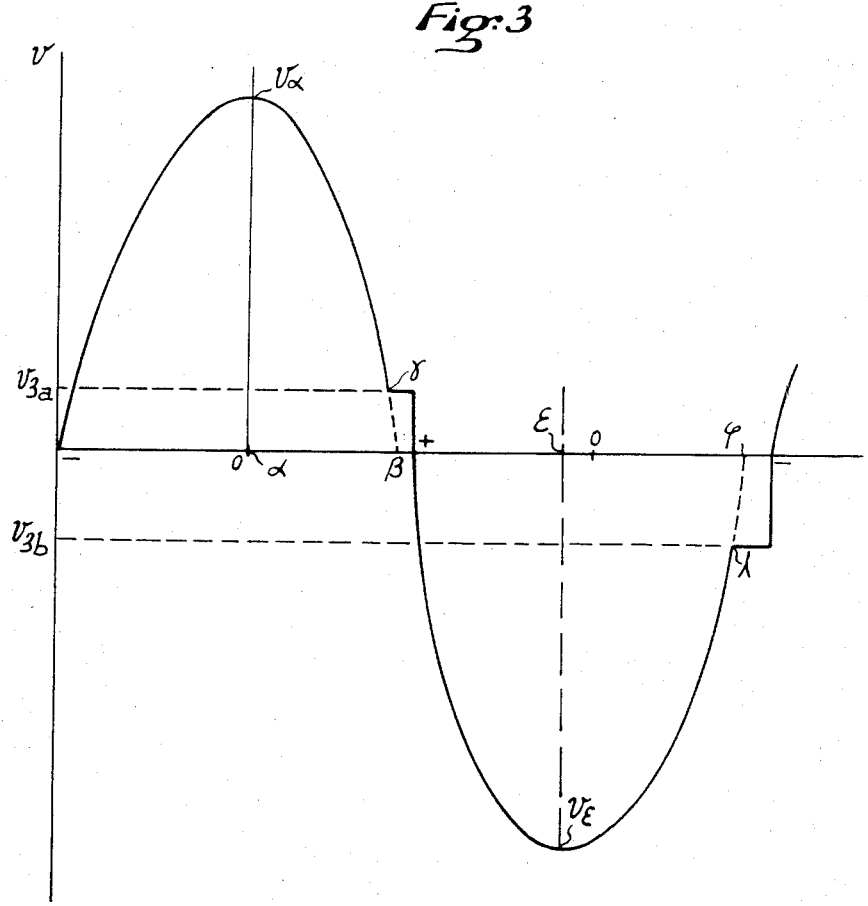
FIG. 3 is a graph of the speeds.

If one considers FIG. 2 and the system subjected to the only resultant force $F_R$, one sees that up to point $\alpha$, the oscillating device is subjected to a positive force of the same direction as its displacement, due substantially to the work stored in spring 2a. Therefore, its speed will increase from speed zero at point (—) to the maximum speed V (FIG. 3). The oscillating device will have a kinetic energy corresponding to the cross hatched area a. From point $\alpha$, the oscillating device will be subjected, in particular, to the compression force $f_{2b}$ of spring 2b, and to the compression force Fc of the hay mass in chamber 8, of which force the curve has a hyperbolic shape, the resultant being a resistance force opposed to the movement. The speed of the oscillating device will decrease and if there was no sustaining force applied to the system, the speed would come to zero at point b where the cross-hatched area b representing the work by the system is equal to area a. for reaching point (+), energy corresponding to area c cross hatched in dotted lines has to be supplied to the system. From FIG. 2, one sees that the work is performed against a high resistance force $F_r$. As regards the speeds and as is shown in FIG. 3, as soon as the displacement speed of piston 3a multiplied by the cross-section of said piston becomes smaller than the total flow rate, the valve 6a through which the jack was drawing from the tank closes and the pump discharges into the chamber by imposing on the flow a minimum speed $v_{3a}$. From point $\tau$ (FIG. 3) and up to the dead point (+) corresponding to the end of compression, the press is operated not by the kinetic energy of the oscillating system but by the hydraulic jack.

During the return stroke, the hay mass compressed in chamber 8 by piston 7 expands according to curve $F_r$ by restoring some energy to the system. At the origin of the return movement of the device, the latter is subjected to force $F_r$ and to the compression force $f_{2b}$ of spring 2b, then from point $\delta$ to only the force of spring 2b to which is progressively opposed the compression force $f_{2a}$ of spring 2a. In fact, the forces applied to the system are in equilibrium at point $\epsilon$ to which corresponds the maximum return speed $v_\epsilon$.

From said point, the force $F_{Rr}$ being positive, viz. opposite the return movement, the speed decreases and falls to zero at point $\phi$ corresponding to the equality of areas d and e. One should remark here that if the two springs 2a and 2b had the same resilient characteristics, and since the detent energy of the hay is returned to the system at the beginning of the return movement, point $\phi$ apart from the friction, would be beyond point (—). To come back to the dead point, one should dissipate said energy and if the slope of $f_{2a}$ was the same as that of $f_{2b}$, area a would be smaller and therefore area b would be larger. One can use a spring 2a less resilient than spring 2b so that point $\phi$ is reached before the dead point (—). During this return stroke, valve 5a is opened so that the jack 3a delivers to the tank and the jack 3b draws from the tank via valve 6b up to the moment when the speed of the oscillating system multiplied by its cross-section becomes less than the flow-rate of pump 4b (speed $v_{3b}$ in FIG. 3). From this moment, the oscillating device is driven by jack 3b which supplies it with the energy shown by the area hatched in broken lines f (FIG. 2). The jack 3b having to supply the system with a smaller force than jack 3a, it can be of smaller cross-section and since the pumps 4a and 4b can be embodied by the same pump with switching of the connections, the speed $v_{3b}$ will be higher than $v_{3a}$.

One sees that with the method according to the invention, the speeds are much higher than those which the hydraulic systems attain and are at least equal to said speeds during the periods where there is a supply of power by the hydraulic jacks; the compression force attainable is much higher than that which could be provided by an oscillating type inertia device, and finally one can recover the detent energy of the compressed hay and increase the device's potential energy respectively at the beginning and at the end (area f) of the return movement.

Figure 4:
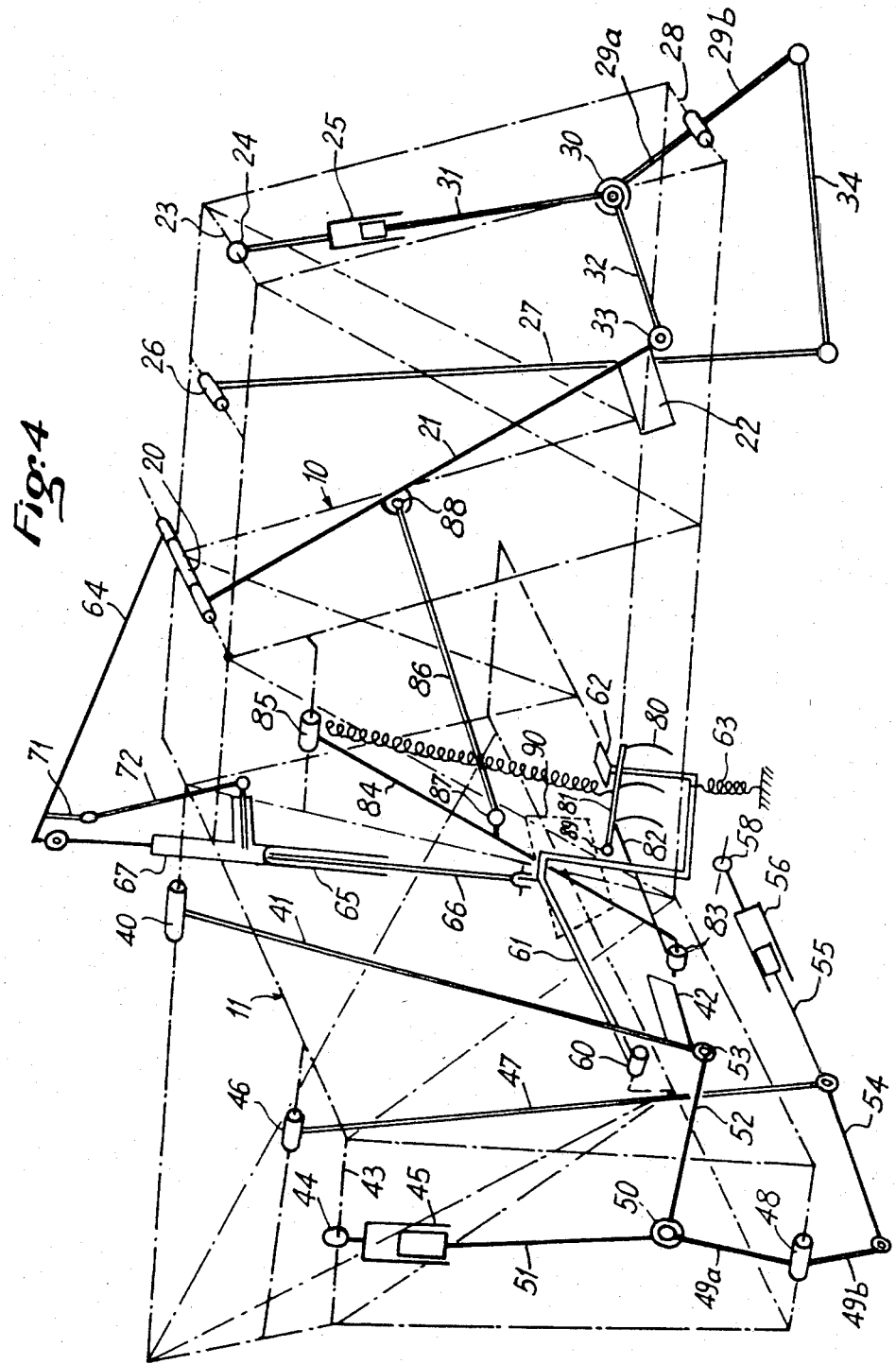
FIG. 4 is a general diagram for explaining the kinematic of the very high density press according to an embodiment of the invention.

The general arrangement of a first embodiment of the press will now be described with reference to FIG. 4 where the elements of the frame have been shown in chain-dot lines. The press is of the pendular oscillating type. The frame comprises a first assembly 10 the orientation of which is parallel to the displacement direction of the machine and a second assembly 11 the general orientation of which is perpendicular to that of assembly 10.

The frame assembly 10 corresponds to the first compression stage and it carries a number of axles which are perpendicular to its orientation direction, viz., in its upper plane, the articulation axle 20 of the suspension arm 21 of pendular piston 22, the axle 23 from which is suspended, by a swivel 24 which will be described in more detail hereafter, the jack 25 of the first compression stage and an articulation axle 26 of the pendular arm 27 of the dynamic equilibration mass and, at its front lower portion, the articulation axle 28 of the crank of the connecting rod assembly which is a balance-beam with two arms 29a, and 29b. At the end of arm 29a are articulated via a swivel 30 the end of the rod 31 of jack 35 and a connecting rod 32 the other end of which is articulated via a swivel 33 to the end of the pendular arm 21 of piston 22. At the end of arm 29b is articulated a connecting rod 34, the other end of which is articulated at the free end of the pendular arm 27 of the equilibration mass.

The frame assembly 11 corresponds to the second compression stage and it carries likewise a number of axles which are perpendicular to its orientation direction, viz., in its upper plane, the articulation axle 40 of the suspension arm 41 of the pendular piston 42 providing the compression of the second stage, the axle 43 from which is suspended, via a swivel 44 similar to swivel 24, the jack 45 of the second compression stage and an articulation axle 46 of the pendular arm 47 of the dynamic equilibration mass of said stage and, at its lower side portion, the articulation axle 48 of the crank of the connecting rod system which is a balance-beam with two arms 49a, 49b. At the end of arm 49a are articulated via a swivel 50 the end of the rod 51 of jack 45 and a connecting rod 52 the other end of which is articulated via a swivel 53 to the end of the pendular arm 41 of piston 42. At the end of arm 49b is articulated a connecting rod 54 the other end of which is articulated to the free end of the pendular arm 47 of the equilibration mass. At that same point is on the other hand articulated the rod 55 of a thrust jack 56 the other end of which is articulated at 58 to the frame.

Figure 7:
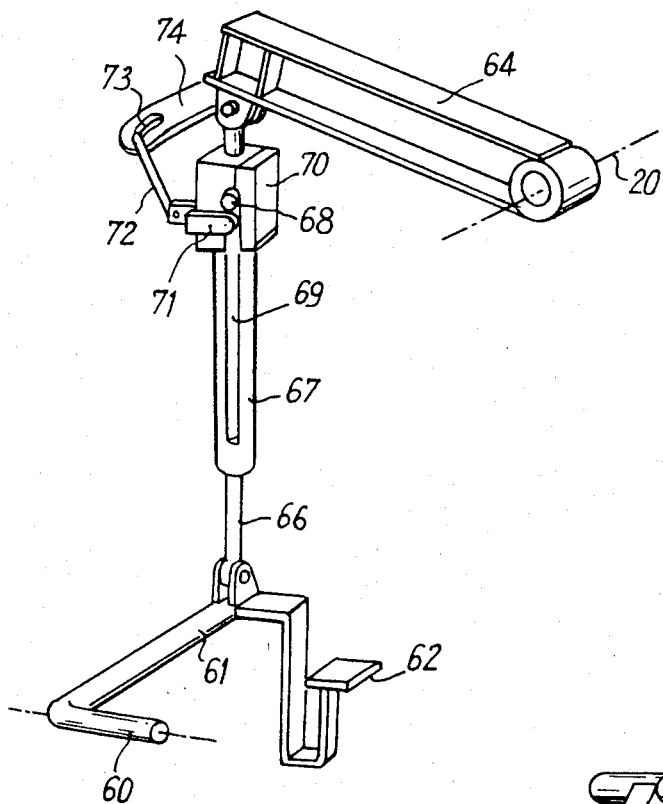
FIG. 7 is a detailed view of the ejection device.

The frame assembly 11 carries, on the other hand, a side axle 60 perpendicular to its orientation and situated at its lower portion. On said axle 60 is articulated an arm 61 which is curved four times at right angles as is shown in FIG. 4 so as to pass below the second stage compression chamber and to come to bear from underneath against an ejector plate 62 which is housed inside a window at the bottom of the lower wall of the second stage compression chamber and which can be pulled up by arm 61 in order to extend into said chamber and eject the compressed hay block at the bottom of said chamber. The arm 61 and the plate 62 are returned to their lowest position by a spring 63. Their driving is performed by an arm 64 keyed onto shaft 20 and driven by the first stage compression piston 22. At the end of arm 64 is articulated a telescopic connecting rod 65. Said telescopic connecting rod 65 comprises (FIG. 7) a rod 66 which slides inside a shaft 67. At its end, the rod 66 carries a roller 68 the spindle of which extends through a slot 69 in the shaft. On the casing of head 70 of the shaft is tippingly mounted a cam finger 71 which overlies slot 69 below roller 68. The tipping of cam 71 is performed by a small connecting rod 72 whose end which is opposite to the cam is engaged in a window 73 of a flange 74 rigidly connected to arm 64. Said end of the small connecting rod 72 moves inside window 73 when the angle between arm 64 and the telescopic connecting rod 65 varies between a maximum corresponding to the complete back stroke of the first stage compression piston 22 and a value corresponding to an angle set in advance for said piston. During said stroke of the first stage compression piston, the roller 68 is maintained by cam 71 and the plate 62 is lifted for performing the ejection but, as soon as the set angle is exceeded, the cam 71 frees the roller 68 and the arm 61 as well as the plate 62 fall back down.

Figure 8:
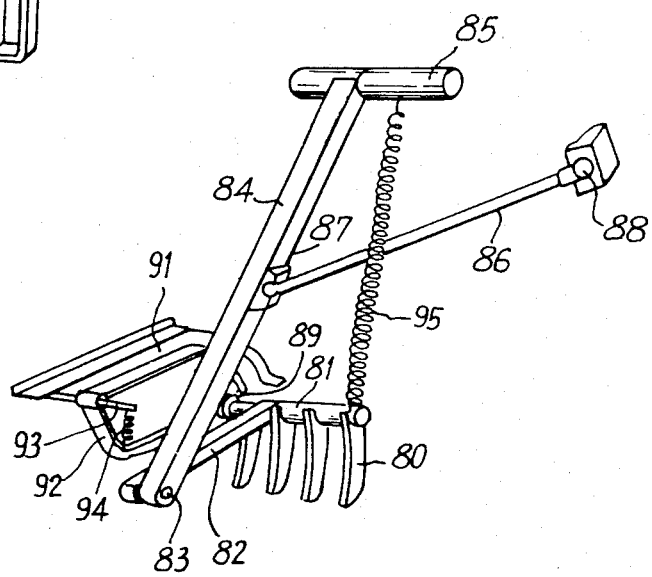
FIG. 8 is a detailed view of the hay feeding device.

The loading of the hay from the platform, where it has been brought by a pick-up and a screw of any known type, in the first stage compression chamber is ensured by a device comprising a number of rigid teeth 80 connected at their upper end by a crosspiece 81 rigidly connected to a T-shaped arm 82 (see FIG. 8). The rear end of arm 82 is articulated by an axle 83 to the end of a pendular arm 84 mounted by an axle 85 on the frame, said axle being parallel to the orientation of the element of frame 10. The driving of this device is provided by an oblique connecting rod 86 which is connected by a swivel at 87 to an intermediate point of the pendular arm 84 and at 88 to an intermediate point of the pendular arm 21 of piston 22. At one of its ends, the crosspiece 81 carries a roller 89 which is in engagement with a cam track 90 shown in dotted line in FIG. 4. As is shown in FIG. 8, said cam track comprises an upper channel 91 and a lower cam surface 92. The exit of roller 89 from channel 91 in which it travels according to an upward direction to the rear and its return to the cam surface 92 are provided by a unidirectional switching-off system formed by a flap 93 articulated about a horizontal pin and returned into engagement via its free edge against the upper wall of channel 91 by a spring 94. A spring 95 biases roller 89 for maintaining in contact with the active surfaces of the cam track 90. When the first stage compression piston 22 undergoes its forward compression stroke, the arm 84 is tipped and moved up and the roller 89 follows a trajectory defined by channel 91 so that the teeth 80 are lifted and brought backwards behind the hay brought on the plate. When on the contrary the first stage compression piston 22 disengages by moving backwards, the small connecting rod 26 tips the arm 84 and the roller 89 describing the cam surface 92 moves back the teeth 80 downward for resting against the plate and brings them forward in the direction of the trajectory of the compression piston 22 so as to compress the hay in the first stage compression chamber.

Figure 5:
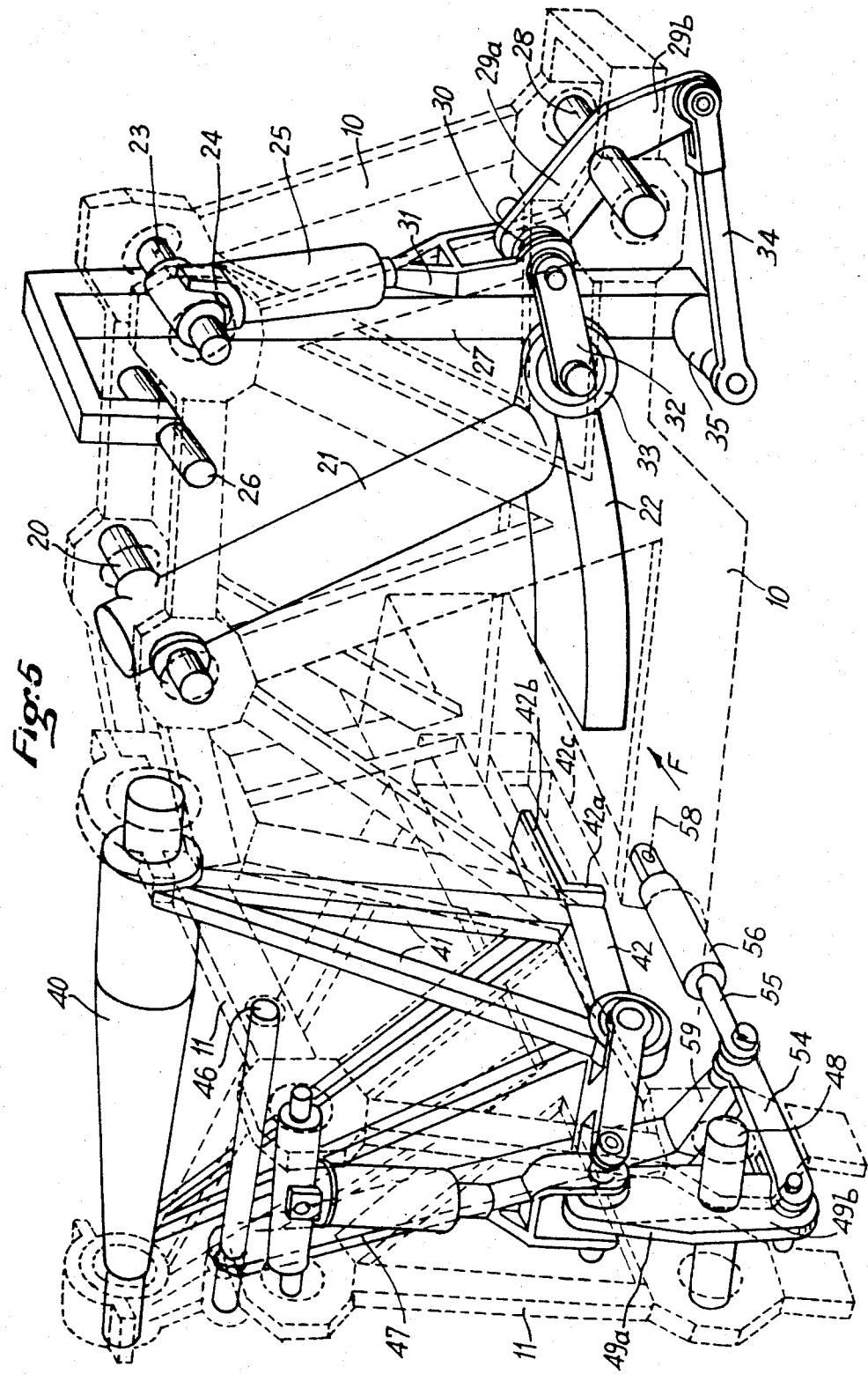
FIG. 5 is a perspective view of the mechanical elements forming the two compression stages, the frame elements being shown in phantom.
Figure 6:
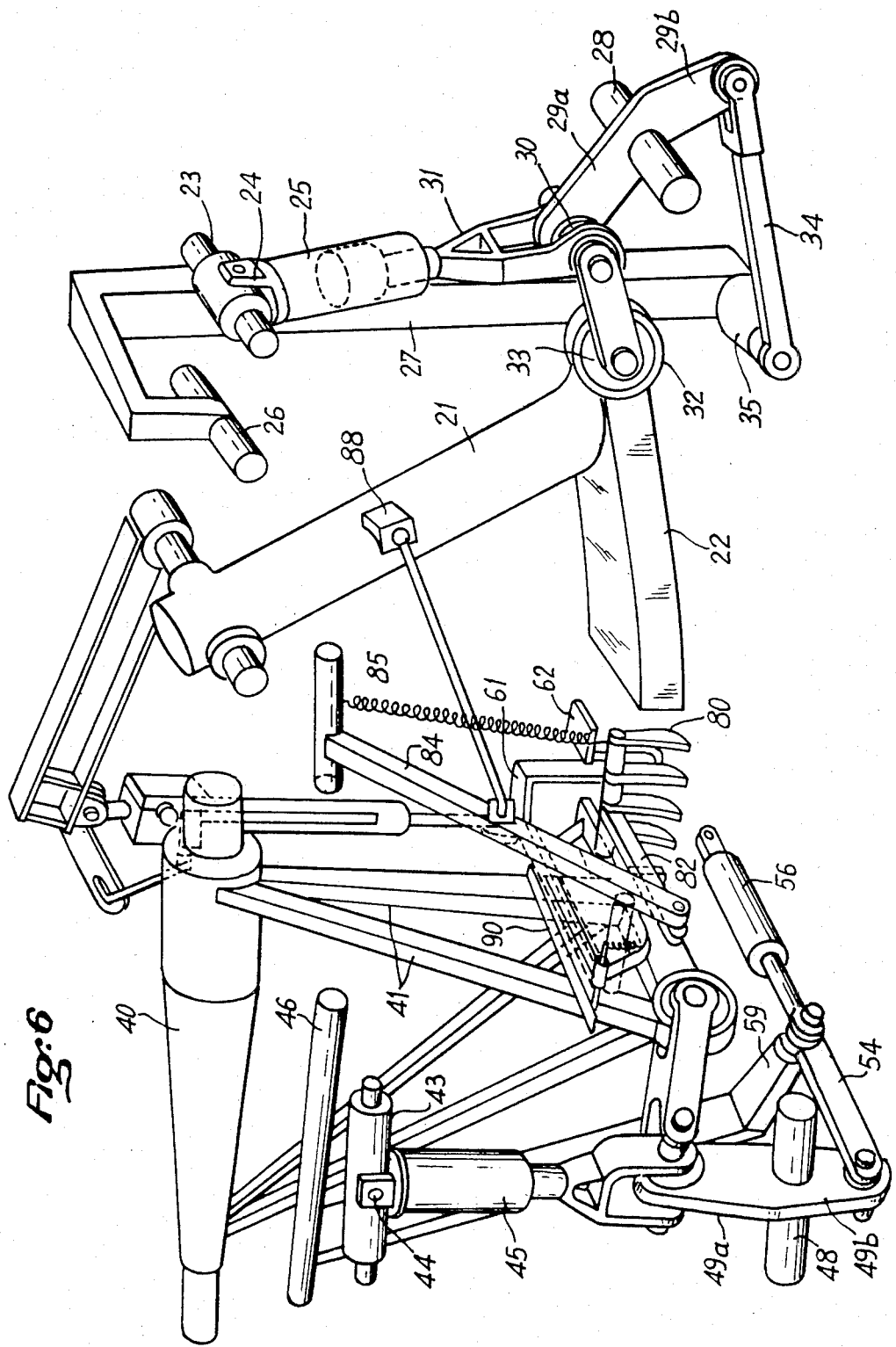
FIG. 6 is a perspective view, the frame being omitted, of the mechanical elements forming the two compression stages, the ejection device and the hay loading device.

FIGS. 5 and 6 are given as an illustration and the same elements are shown, designated by the same reference numerals. However, one will note in addition the presence of the equilibration masses 35 of the first stage and 59 of the second stage and the shape of the piston 42 of the second compression stage which comprises a radial wall 42a and a curved upper wall 42b forming the upper wall of the second stage compression chamber, in which chamber the hay is compressed by the first stage piston 22 through a window 42a. The walls of the first stage compression chamber have not been shown, their structure resulting immediately from the shape of the compression piston 22, since the piston 22 oscillates around shaft 20 and since the hay is loaded by the teeth 80 in the direction of arrow F (FIG. 5). They comprise two cylindrical sector-shaped walls centered on axis 20, which extend above and below the cylindrical sectors of piston 22 and end along the upper and lower edges of window 42c, and two radial walls connecting the two above mentioned walls for forming a channel, the one facing arrow F being formed with a window in which the teeth 80 come to rest.

Figure 9:
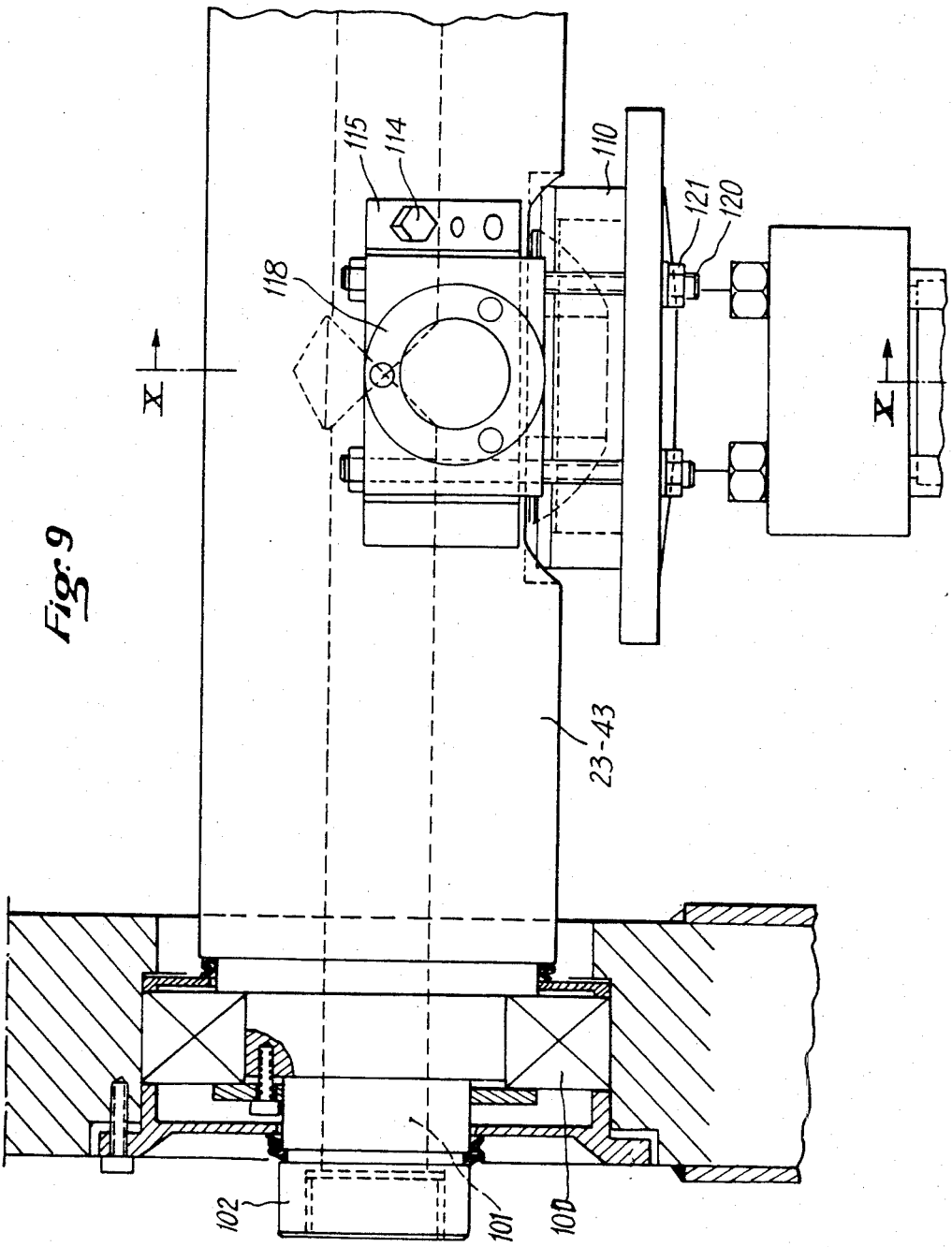
FIG. 9 is a half elevation view of the mounting of the jack on its top axis.
Figure 10:
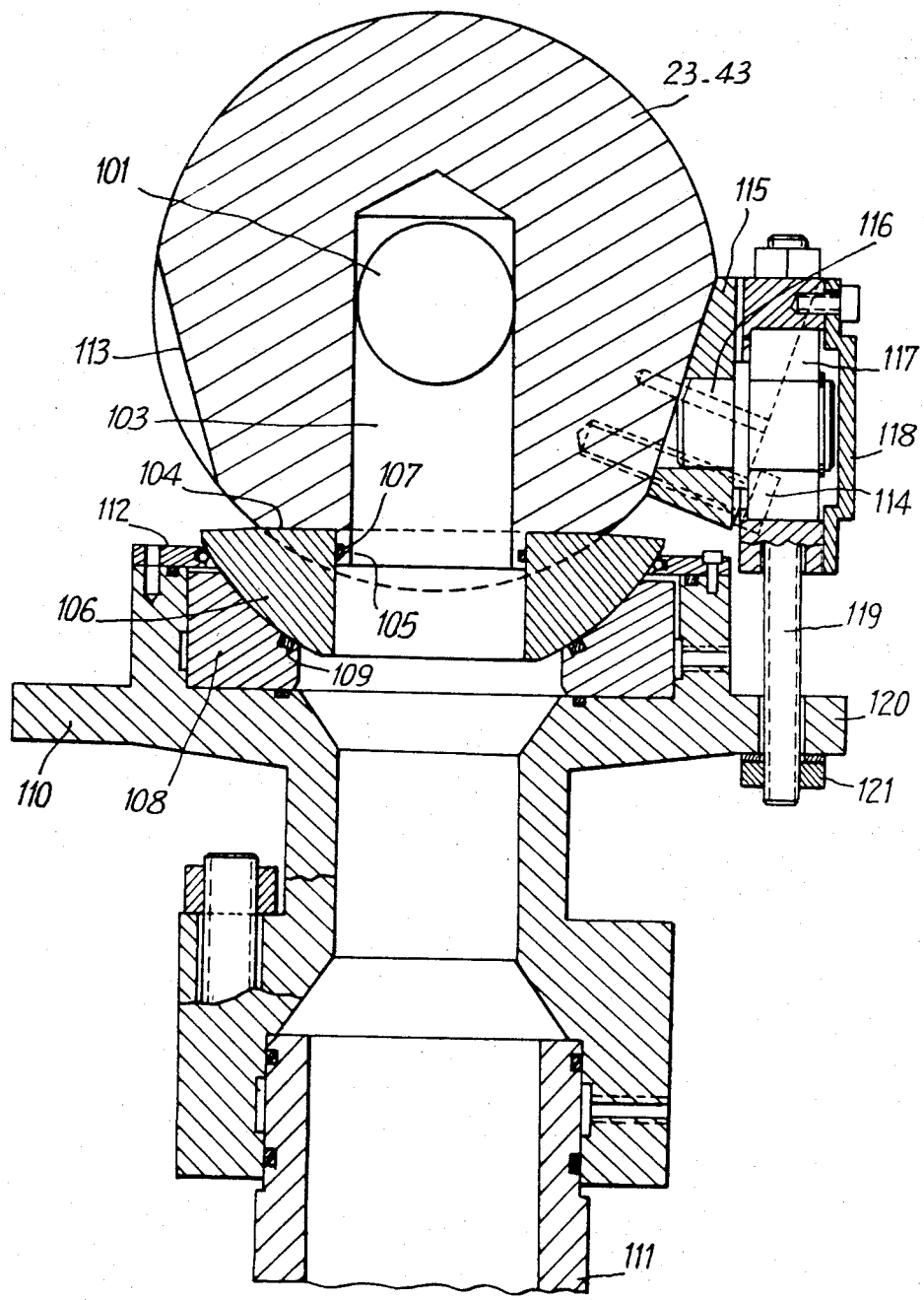
FIG. 10 is a sectional view along line X—X of FIG. 9.

The construction of the swivels 24 and 44 for the fixation of the jacks 25 and 45 on their axes 23 and 43 is shown in more detail in FIGS. 9 and 10. The shaft 23-43 is mounted in the frame by roller bearings 100. Said shaft is formed with a channel 101 ending at one of the shaft ends in a rotating coupling 102. The shaft has a radial channel 103 opening into channel 101. Around the outlet of channel 103, the shaft is machined so as to form a planar support surface 104 with in the centre a tubular support surface 105 surrounding the outlet of channel 103. On said two support surfaces 104 and 105 is fitted a spherical cap-shaped part 106, the tightness being provided by a seal 107. On this spherical cap bears a friction ring 108 formed on its contact face with an opening of the same sphericity in which is housed a sealing joint 109. Said ring is housed inside a chamber of part 110 forming the head of body 111 of the jack and is maintained therein by a ring 112. The ring 108 and the head of jack 110 are formed with axial bores providing a communication between the channel 103 and the chamber of the jack body 111. Seals provide the tightness between the various parts. The mounting of the jack on the axle is completed by two opposite planar support surfaces 113 formed on the shaft, on which are secured by screws 114 soles 115 in each of which is engaged a shaft stub 116 the axis of which extends through the centre of the spherical cap 106. On each of the shaft stubs 116 is mounted, via a roller device 117, a roller box 118 comprising two parallel bores perpendicular to the rolling axis and placed on either side of the threaded draw-rods 119 extending through said bores and into holes through a plate 120 of the head of jack 110, with screws 121 for adjusting and equilibrating the clamping of the jack head on the spherical cap 106.

Figure 11:
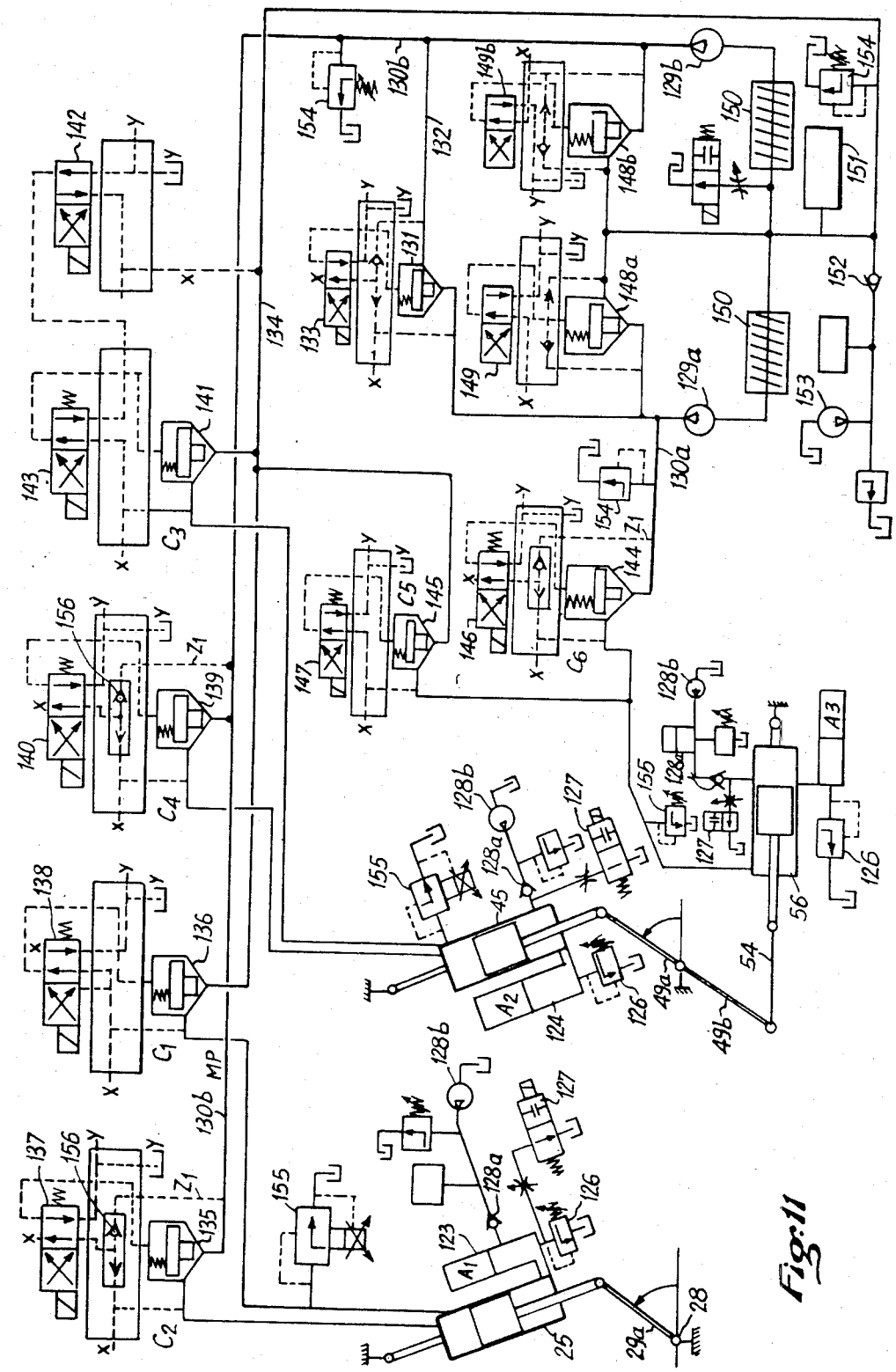
FIG. 11 is a diagram of the hydraulic circuit.

With this mounting, the jack can rotate about the axis of shaft 23-43 and rotate about the axis of the shaft stubs 116 which is perpendicular to shaft 23-43, thereby ensuring a swivel mounting of the jack, with a sufficient clearance angle. The supply of the jack which acts substantially in compression is also provided in a simple way through the mechanical means providing its suspension. The jacks 25, 45 and 56 are energy recovering jacks. More exactly, the jacks cause the transmission to the oscillating device of the return forces at the dead points provided by the springs 2a and 2b of FIG. 1. As is shown in FIG. 11, the chamber of said jacks which is not subjected to the high pressure is in communication with a hydropneumatic accumulator 123, 124 and 125 respectively, which plays the part of the springs 2a and 2b of FIG. 1. Each hydropneumatic accumulator is provided with a calibrated safety valve 126, an electromagnetic slide-valve 127 adapted for causing the chamber and the accumulator to communicate with the exhaust when the machine is completely stopped, and with a unidirectional valve 128a controlling the communication with source 128b.

The hydraulic circuit comprises two pumps 129a, 129b delivering into high pressure pipes 130a, 130b, said pipes being interconnectable via a valve 131 hydraulically controlled and fitted in the connection pipe 132. The pressure chamber of said valve is placed in communication with the high pressure or the exhaust by an electromagnetic valve 133. Reference numeral 134 designates the low pressure return pipe.

The working chamber, opposite the chamber connected to the hydropneumatic accumulator of the first stage jack 25 is placed in communication with pipe 130b or with pipe 134 via hydraulically controlled valves 135 and 136 respectively, the placing under pressure or the communication with the exhaust of the pressure chambers of valves 135 and 136 being controlled by electromagnetic valves 137 and 138. The working chamber opposite the chamber connected to the hydropneumatic accumulator of jack 45 is placed in communication with pipe 130b via a hydraulically provided controlled valve 139, controlled by an electromagnetic valve 140, and with pipe 134 via a hydraulically controlled valve 141 controlled by electromagnetic valves 142 and 143. The electromagnetic valve 140 places the pressure chamber of the hydraulic valve 139 in communication either with pipe 130b or with jack 45, or with the exhaust. The electromagnetic valve 143 places the pressure chamber of valve 141 in communication with the working chamber of jack 45 or, through the electromagnetic valve 142, with the exhaust or with pipe 134. The working chamber, opposite the chamber connected to the hydropneumatic accumulator of jack 56, is placed in communication either with pipe 130a or with pipe 134 via two hydraulically controlled valves 144 and 145, the pressure chambers of which can be placed under pressure or into communication with the exhaust by electromagnetic valves 146 and 147. Two hydraulically controlled valves 148a and 148b controlled by electromagnetic valves 149a, 149b which place their pressure chambers in communication with pipes 130a and 130b or 134 or with the exhaust, control the placing in communication of pipes 130a and 130b with pipe 134 which is connected to the suction side of pumps 129a, 129b via coolers 150 and with a low pressure accumulator 151. The low pressure accumulator 151 is in communication via an unidirectional valve 152 with a pump 153 coupled to its own accumulator and safety valve. Reference numerals 154 designate the safety valves fitted on the high pressure pipes 130a, 130b and on the low pressure pipes 134 and reference numerals 155 designate safety valves limiting the pressure in the jacks working chambers.

Starting from the return dead point position of the first stage (jack 25) in which accumulator 123 is under pressure, the valves 148a, 148b are opened and the valves 135, 136 and 141 are closed. The electromagnetic valve 138 controlling valve 136 is actuated to place its pressure chamber in communication with the exhaust. Under the thrust of the pressure prevailing in the working chamber of jack 25, created by the hydropneumatic accumulator 123, the valve 136 opens and places said chamber of jack 25 in communication with pipe 134. The jack 25 retracting itself brings back said jack 25 and the crank 29a, said position being exceeded under the effect of the kinetic energy. During this movement, the electromagnetic valves 149a, 149b and 133 are operated for closing the valves 148a, 148b and for opening valve 131, the pressure chamber of the latter being placed in communication with the exhaust. The electromagnetic valve 137 is simultaneously operated for placing in communication with the exhaust the pressure chamber of valve 125 which opens, the two pumps 129a and 129b discharging in parallel through pipe 130b in the pressure chamber of jack 25. The electromagnetic valve 138 is reversed, for placing the pressure chamber of valve 136 in communication with the working chamber of jack 25, but as long as said pressure remains lower than the low pressure due to the kinetic energy of the oscillating assembly of the first stage, the valve 136 remains open for maintaining the pressure chamber filled, the flow in said valve 136 being reversed. When the pressure in the working chamber of jack 25 becomes higher, as hereabove discussed with reference to FIGS. 1 to 3, it closes the hydraulic control valve 136. The end of the compression of the first stage is provided by pumps 129a and 129b discharging in jack 25, the accumulator 123 being simultaneously repressurized. The arrest of the compression movement is provided by switching over the electromagnetic valve 137 and by opening one of valves 148a or 148b by placing its pressure chamber in communication with the exhaust. The pressure prevailing in pipe 130b becomes lower than the pressure in the working chamber of jack 25 which is in preferential communication, due to the unidirectional valve 156, with the pressure chamber of valve 135 which closes. The return movement of the first stage is carried out exactly according to the same process, with the exception that the increase of pressure at the end of the stroke in the chamber of jack 25 is due to the placing under pressure of the hydropneumatic accumulator 123 and not to said pressure and to the compression of the hay.

The operation of the second stage, viz. the control of jack 45, is similar to that of the first stage but during the compression, it is the maximum pressure obtained on the hay which controls the closing of the hydraulic valve 139 and the opening of valve 141 instead of a positive control connected to the position at the dead point of crank 49a. During the return phase, the electromagnetic valves 142 and 143 are switched over for placing the pressure chamber of valve 141 in communication with the low pressure of pipe 134, and not with the working chamber of jack 45, so that the valve 141 remains closed and the jack 45 cavitates towards its lower dead point, thereby reducing the volume of oil transferred into jack 45. A new inflation of the hydropneumatic accumulator 124 against the cavitation of jack 45 is provided by jack 56, the valve 145 being closed and the valve 146 being open. The electromagnetic valve 147 is switched over for opening valve 145 during the compression phase for maintaining the jack 56 out of action. Moreover, during the return phase of the two stages, said returns occurring simultaneously, the valve 131 is closed, the pump 129b supplying jack 25 and pump 129a supplying jack 56 while jack 45 cavitates.

Figure 12:
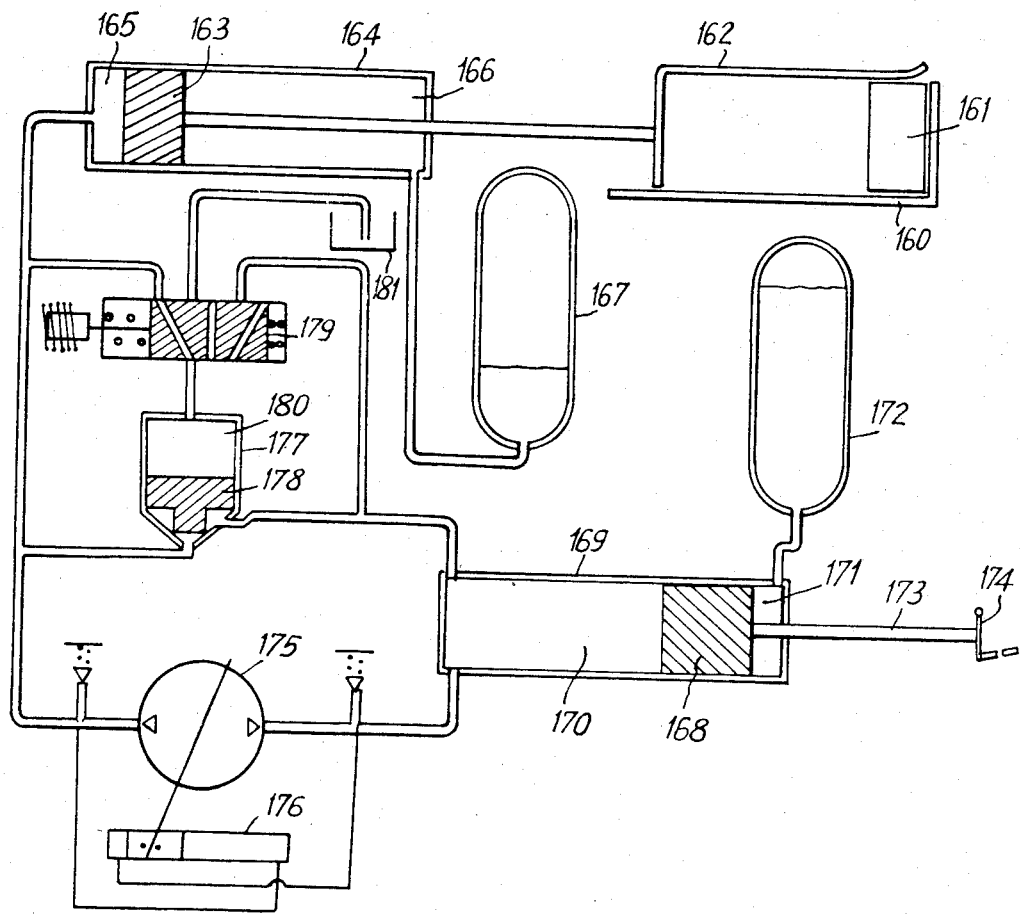
FIG. 12 is a diagram of an alternative embodiment of a stage of the hay press.

The embodiment of the compression stage shown in FIG. 12 comprises a hydraulic transmission and not the mechanical connecting rod assemblies such as 29b-34 or 49b-54 the portion providing the compression and the equilibration mass. Moreover, the translation movements are rectilinear and no longer pendular. In this Figure, reference numeral 160 designates the compression chamber of the stage, 161 the piston providing the first compression of the hay mass compressed by the first stage piston 162, 163 the piston of the jack 164 driving said piston, 165 and 166 respectively the working chamber and the chamber in communication with the hydraulic accumulator 167 of said jack, 168 the dynamic equilibration mass formed by the piston of a jack 169, 170 the working chamber of said jack and 171 chamber in communication with the hydropneumatic accumulator 172, 173 the detection rod of the position of the equilibration mass 168 which cooperates with a dead point detector 174, 175 the feeding pump the direction of the flow and the cylinder volume of which are controlled by a servo-controlled device 176, 177 a hydraulic control valve whose plunger forming a piston is designated at 178, and 179 an electromagnetic valve which places the pressure chamber 180 of valve 177 in communication with chambers 165 or 170 or with the exhaust to tank 181.

The operation of the hereabove described oscillating system press with hydraulic transmission is as follows, starting from the position shown in FIG. 12.

The press piston 162 is in its maximum return position and the hay is fed into chamber 160. The piston 163 of jack 164 is at its rear dead point, the accumulator 167 being at the minimum pressure. The equilibration piston 168 of jack 169 is also at its rear dead point, its chamber 171 being in communication with the hydropneumatic accumulator 172 at the maximum pressure. The detector 174 detects the rear dead point and controls the distributor 179 which places chamber 180 of the cartridge valve 177 in communication with the tank. The pressure in chamber 170 of jack 169 exerted under the plunger 178 of valve 177 opens the latter and the chamber 170 is placed in direct communication with chamber 165, thereby starting the active stroke under the action of the hydropneumatic accumulator 172. During the same time, pump 175 is reversed for discharging its maximum flow in chamber 165. The distributor 179 is controlled substantially at the moment when the pressures in accumulators 167 and 172 are equal for placing chamber 180 of the cartridge valve 177 in communication with chamber 165 of jack 164. Due to the kinetic energy of the assembly, the pressure in chamber 165 remains lower than the pressure in chamber 170, the pump 175 goes on discharging without pressure and the piston 178 remains in the open position. The pump which was supplying only part of its flow in parallel with 177 tends to supply alone the flow to jack 164, the compression force of the hay slowing down the movement. The speed of piston 163 of jack 164 is then determined by the flow from pump 175. The pressure in pump 175 exceeds that in chamber 170 and the cartridge valve 180 closes. The compression of the hay occurs then under the action of the flow from the pump which can be reduced until the required compression pressure is reached if pump 175 is of the variable flow type. The accumulator 167 is then at its maximum pressure and the accumulator 172 at its minimum pressure.

The return stroke is started by bringing distributor 179 into the position placing chamber 180 of the cartridge valve 177 in communication with the tank. The pressure in chamber 165 which is equal to the pressure in the accumulator 167, increased by the resilient return force of the compressed hay, lifts the plunger 178 and the pressure in chamber 165 causes a flow towards chamber 170 of jack 169, the speed of the device increasing progressively. Substantially at the moment when the pressures in accumulators 172 and 167 are equal, distributor 169 is controlled for placing chamber 180 of the cartridge valve 177 in communication with chamber 170 of jack 169. Due to the kinetic energy of the assembly, the pressure in chamber 170 remains lower than the pressure in chamber 165. When this ratio is reversed, the cartridge valve 180 closes. The pressure increase in the hydropneumatic accumulator 172 occurs then under the action of the flow from pump 175 until the return dead point is reached, which is detected by detector 174. It should be noted that one can obtain a dwell at said dead point if the flow from the pump is cancelled and if the placing in communication of chamber 180 of the cartridge valve 177 is servo-controlled by another control.

I claim:

1. A method of sustaining the oscillatory movement of an oscillating device of the type comprising a mass oscillating between dead points on opposite sides of a point of equilibrium with a potential force acting to return the mass toward the point of equilibrium, said potential force increasing when the mass recedes from said point of equilibrium and being maximum at said dead points and the speed of the oscillating mass being maximum adjacent said point of equilibrium, comprising applying from a motive source to said device a force superior to said maximum potential force at a speed lower than the speed of the device adjacent said point of equilibrium, the force of the motive source being applied to said mass on the portion of the path of movement of said mass preceding a said dead point, and the application speed of the force of the motive source being higher than what would be the instantaneous speed of said mass along said portion of its trajectory were said force of the motive source not applied.

2. A method as claimed in claim 1, and applying said force of the motive source to said mass on only that portion of the path of movement of said mass which precedes a said dead point and which is spaced a substantial distance from said point of equilibrium.

3. A method as claimed in claim 1, in which said force of the motive source is first applied to said mass at a point closer to a said dead point which is being approached by said mass than to said point of equilibrium.

4. A method according to claim 1, wherein the motive source is put out of action when the oscillating device reaches the considered dead point.

5. A method according to claim 1, wherein the motive source is put out of action when the motive force which it exerts on the oscillating device reaches a predetermined value.

6. A method according to claim 1, wherein the oscillating device is frequency piloted, the reversal of the direction of the force exerted by the motive source at the level of a dead point, said reversal comprising the cancellation of said force, occurring at a frequency lower than the natural oscillation frequency of the device.

7. A method according to claim 1, wherein a portion at least of said potential force of the oscillating device is provided by a resilient means stretched, at least in part, by the device sustaining the oscillation.

8. A method according to claim 7, wherein the resilient means has an energy storing capacity which is higher than the kinetic energy of the oscillating device.

9. An oscillating device of the type comprising a mass oscillating between dead points on opposite sides of a point of equilibrium with a potential force acting to return the mass toward the point of equilibrium, said potential force increasing when the mass recedes from said point of equilibrium and being maximum at said dead points and the speed of the oscillating mass being maximum adjacent said point of equilibrium, comprising a motive source, and means to apply from said motive source to said device a force superior to said maximum potential force at a speed lower than the speed of the device adjacent said point of equilibrium, the force of the motive source being applied to said mass on the portion of the path of movement of said mass preceding a said dead point, and the application speed of the force of the motive source being higher than what would be the instantaneous speed of said mass along said portion of its trajectory were said force of the motive source not applied.

10. A device as claimed in claim 9, and means applying said force of the motive source to said mass on only that portion of the path of movement of said mass which precedes a said dead point and which is spaced a substantial distance from said point of equilibrium.

11. A device as claimed in claim 10, in which said force of the motive source is first applied to said mass at a point closer to a said dead point which is being approached by said mass and to said point of equilibrium.

12. An oscillating device as claimed in claim 9, having a sustaining force provided by a hydraulic fluid under pressure, wherein the oscillating mass is rigidly associated with hydraulic power receivers adapted for exerting on said mass a thrust bringing it back to each of its dead points, said receivers being set selectively in controlled communication with a source of incompressible fluid under pressure and capable of sucking at a flow rate ensuring their repletion at the maximum speed of their instantaneous volume displacement from a source of the same fluid, and wherein that one of said receivers which exerts a thrust towards the terminal dead point of the oscillation in progress is selectively fed.

13. An oscillating device according to claim 12, wherein at least part of the kinetic energy of the oscillating device is absorbed at the end of the oscillation of said device and is restored in the initial portion of the following oscillation by a spring which is preferably formed by a hydropneumatic reciever.

14. A press, comprising a piston actuated by apparatus according to claim 9, wherein the initial phase of the compression work is provided by the potential energy stored during the return stroke of the press piston in a resilient accumulator and restored in the form of kinetic energy to the oscillating device, the final phase of the compression work being ensured by a driving device applying a high thrust force at a reduced application speed.

15. A press according to claim 14, wherein a resilient accumulator is stretched at the end of the compression stroke by the driving device which provides a high thrust force at a reduced application speed, the energy stored in said resilient accumulator being restored to the oscillating device during the return stroke.

16. A press according to claim 15, wherein the kinetic energy remaining at the end of the return stroke is stored, with the optional addition of an extra energy provided by the driving device, in a resilient accumulator stretched at the end of the return stroke, the energy stored in said resilient accumulator being restored to the mechanical device at the beginning of the compression stroke.

* * * * *